United States Patent [19]

McAteer

[11] Patent Number: 5,703,957

[45] Date of Patent: Dec. 30, 1997

[54] DIRECTIONAL MICROPHONE ASSEMBLY

[75] Inventor: Jeffrey Phillip McAteer, Fishers, Ind.

[73] Assignee: Lucent Technologies Inc., Murray Hill, N.J.

[21] Appl. No.: 497,269

[22] Filed: Jun. 30, 1995

[51] Int. Cl.⁶ .................................................. H04R 3/00
[52] U.S. Cl. .......................... 381/92; 381/155; 381/168; 381/169
[58] Field of Search ................... 381/92, 155, 168–169

[56] References Cited

U.S. PATENT DOCUMENTS

| | | |
|---|---|---|
| 4,767,220 | 8/1988 | Kamp . |
| 5,226,076 | 7/1993 | Baumhauer, Jr. et al. ............ 379/388 |
| 5,400,408 | 3/1995 | Lundgren et al. ............ 381/159 |

*Primary Examiner*—Curtis Kuntz
*Assistant Examiner*—Duc Nguyen
*Attorney, Agent, or Firm*—Thomas Stafford; Samuel R. Williamson

[57] ABSTRACT

A unitary housing made from an acoustically-opaque, resilient material is employed with a microphone element to form a directional microphone assembly. The microphone element includes a diaphragm which moves under the influence of sound pressure applied to its opposite surfaces to generate an electrical signal which is proportional to the differential sound pressure. The unitary housing includes a first acoustically-transparent channel for communicating sound pressure from a first port in the unitary housing to one surface of the diaphragm, and a second acoustically transparent channel for communicating sound pressure from a second port in the unitary housing to the other surface of the diaphragm. In an illustrative embodiment, the unitary housing comprises a unitary small "boot" having a surface including the ports for coupling acoustic energy to the acoustic channels, an inner chamber for housing the microphone element and a predetermined opening in a surface of the boot for accessing the inner chamber. The microphone element is inserted into the inner chamber via the predetermined opening, which is dimensioned to seal itself around the inserted microphone element so that acoustic energy cannot leak out of or into the inner chamber through the opening.

9 Claims, 3 Drawing Sheets

PERSONAL COMPUTER

DIRECTIONAL MICROPHONE ASSEMBLY

TECHNICAL FIELD

This invention relates to directional microphones and, more particularly, to a structure for holding one or more microphone elements.

BACKGROUND OF THE INVENTION

Microphones having a directional characteristic are useful in many applications. One known technique for achieving directionality is through the use of a first-order-gradient (FOG) microphone element which comprises a movable diaphragm with front and back surfaces enclosed within a capsule. The capsule includes openings on each side thereof for admitting sound pressure to interact with the front and back surfaces of the diaphragm. In response to this interaction, an electrical signal is generated that is proportional to the differential sound pressure on the opposite surfaces of the diaphragm. Sounds are ignored that come from directions in which the wave front arrives at the front and back surfaces of the diaphragm at the same time. In this situation the instantaneous sound pressure on each surface of the diaphragm is identical, so the differential sound pressure is zero. Sounds emanating from other directions reach one surface of the diaphragm before the other according to the delay encountered in traveling an effective path length "d" between the opposite surfaces. This delay creates directionality, but it also affects the frequency response characteristic because path length "d" corresponds to a different fraction of a wavelength at each different frequency.

One known microphone device, designated WM-46AAD201, is available from National/Panasonic and provides a cardioid polar response characteristic. A FOG microphone element is enclosed within a rigid, 2-piece plastic housing which includes openings that permit sound waves to enter the housing on each side of the FOG microphone. The housing and the FOG microphone are mutually held together by glue or other bonding material so that each side of the FOG microphone is exclusively influenced by sound waves entering the appropriate opening in the housing. Unfortunately, the construction of such a device is labor intensive due to the use of bonding materials—an extra step that requires curing time. Moreover, if applied improperly, leaks may result, thus changing the acoustic directional characteristic.

One directional microphone assembly of merit which uses tubes to couple a microphone element to the desired sound pickup points is shown at FIG. 2 of the Knowles Electronics, Inc. Technical Bulletin TB-21, "EB Directional Hearing Aid Microphone Application Notes." Unfortunately, no structural means is provided for supporting such an assembly within sound-input equipment, and the tubes do not appear easily sealed against the equipment surface.

More recently, a directional microphone assembly has been proposed that employs a two (2) housing arrangement, which does not require the use of a bonding material to hold the structure together (see U.S. Pat. No. 5,226,076 issued Jul. 6, 1993). Although this prior microphone assembly operates satisfactorily in certain applications it does have some limitations. For example, as the distance "d" becomes larger than the width of the microphone element both the directivity pattern and frequency response of this prior assembly changes, which is undesirable in some applications.

Therefore, it is desirable to provide a housing for a microphone element which is of relatively simple construction so that manufacture and installation are facilitated.

SUMMARY OF THE INVENTION

A unitary housing made from an acoustically-opaque, resilient material is employed with a microphone element to form a directional microphone assembly. The microphone element includes a diaphragm which moves under the influence of sound pressure applied to its opposite surfaces to generate an electrical signal which is proportional to the differential sound pressure. The unitary housing includes a first acoustically-transparent channel for communicating sound pressure from a first port in the unitary housing to one surface of the diaphragm, and a second acoustically transparent channel for communicating sound pressure from a second port in the unitary housing to the other surface of the diaphragm.

In an illustrative embodiment, the unitary housing comprises a small unitary "boot" having a surface including the ports for coupling acoustic energy to the acoustic channels, an inner chamber for housing the microphone element and a predetermined opening in a surface of the boot for accessing the inner chamber. The microphone element is inserted into the inner chamber via the predetermined opening, which is dimensioned to seal itself around the inserted microphone element so that acoustic energy cannot leak out of or into the inner chamber through the opening. The distance between the ports is relatively short so as not to change the directivity pattern or frequency response of the resulting microphone assembly.

In an illustrative embodiment of the invention, the unitary housing is molded from Ethylene-Propylene-Diene-Monomer with Polypropylene, which is a rubber-like material that is resilient. It forms an excellent seal around the perimeter of the microphone element so that sound pressure in one channel does not leak into the other. Moreover, the rubber-like material forms a seal with the surface of sound-input equipment where it is housed.

It is a feature of the present invention that the directional microphone assembly may be conveniently embedded within or mounted behind an exterior surface of soundinput equipment with the channel openings deployed on one or more of its surfaces.

DETAILED DESCRIPTION

GENERAL

Pressure Microphones

Figure 1:
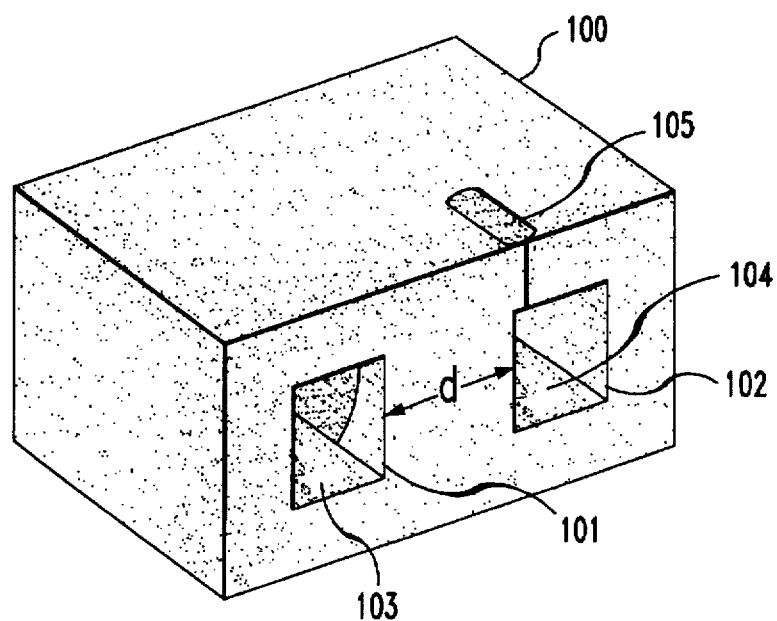
FIG. 1 is a front perspective view of a unitary boot arrangement illustrating the invention.
Figure 2:
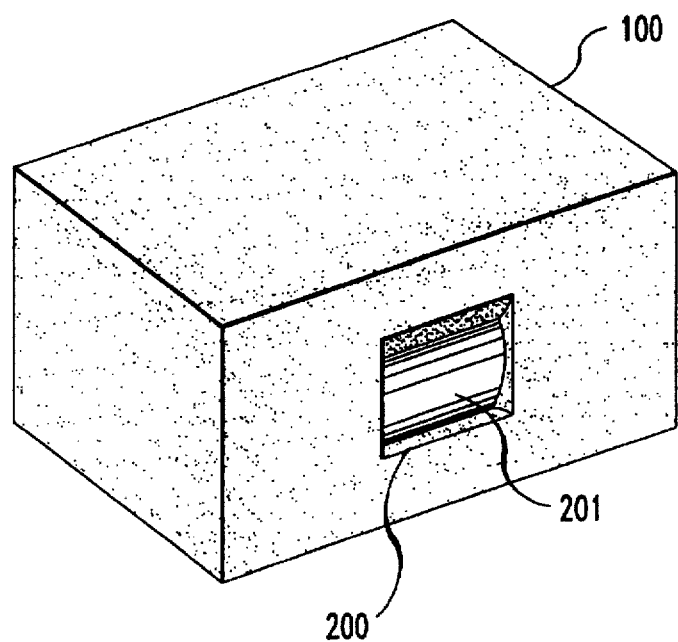
FIG. 2 is a rear perspective view of the unitary boot arrangement employed in the present invention.

Single port microphones are capable of sensing instantaneous sound pressure at their input sound port and producing an electrical output voltage signal corresponding to the magnitude of the sound pressure. Such microphones are known in the art as "pressure microphones". A sound port admits sound, i.e., acoustic energy, into microphone assembly which interacts with one side of a diaphragm to produce an electrical voltage. The other side of the diaphragm resides in a closed region whose volume affects the compliance of the diaphragm. Pressure microphones are equally responsive to sounds coming from any direction and, therefore, their response patterns are omnidirectional.

First-Order-Gradient Microphones

Gradient microphones are those which achieve a directional polar response characteristic by measuring the differential pressure on opposite sides of one or more diaphragms of a microphone element. A first-order-gradient (FOG) microphone typically includes two input sound ports positioned on opposite sides of microphone element diaphragm. The sound ports are separated by an effective distance "d" which represents the distance that a sound wave must travel around the FOG in going from one sound port to the other. Movements of the diaphragm are converted into voltages at the output of the microphone element. The magnitude of the voltage output of the FOG microphone is a function of the instantaneous difference in sound pressure on the opposite sides of microphone element diaphragm. Recall that the velocity of sound in air at 70 degrees Fahrenheit is 1128 feet per second, so that a f=2250 Hz audible signal has a wavelength of about six inches. Thus, even small separation distances provide sufficient phase difference between the sound ports so that the FOG microphone has a bidirectional polar response pattern. In fact, the polar response pattern is largely independent of frequency as will be seen below in equation (2). Note, that the polarity of the output voltage is determined by the particular side of the diaphragm that is first impinged upon by the moving acoustic wave front. Note also that the FOG microphone is unresponsive to sounds coming from certain directions that are known as nulls. This property is of use in the present invention.

The spatial separation "d" between the sound ports leading to opposite sides of the diaphragm of the FOG microphone element may be varied. The pressure gradient $\Delta p$, in the far-field, has the following relationship to "d":

$$\Delta p \propto \sin\left(\frac{1}{2} kd \cos\theta\right) \quad (1)$$

$$\text{where: } k = \frac{2\pi f}{c}$$

$\theta$=polar orientation of the impinging wave front with respect to the major axis of the microphone; and c=wave velocity.

Equation (1) may be simplified for small values of kd to become:

$$\Delta p \propto \frac{1}{2} \cos\theta. \quad (2)$$

The sensitivity or frequency response of a FOG microphone is defined by equation (1) for the direction $\theta=0°$. It is known that the frequency response and the directivity pattern may be changed by altering the gradient microphone itself. For example, acoustic resistance $R_a$ may be introduced into one of the sound ports of the FOG microphone. Such resistance alters both the directivity pattern and the frequency response of the microphone assembly.

More generally, the directivity pattern $D(\theta)$ associated with FOG microphones operating in the far field, and where kd<1 is given by the following relationship:

$$D(\theta) = \left[\frac{1+B\cos\theta}{1+B}\right] \quad (3)$$

$$\text{where: } B = \frac{d/c}{R_a C_a} \text{; and}$$

$$C_a = \frac{V}{\rho c^2}.$$

In equation (3), p is the density of air, V is the volume of the acoustic region behind the diaphragm, and $C_a$ is the acoustic compliance (similar to capacitance) between the diaphragm and $R_a$. From equation (3), a cardioid directivity pattern is achieved when B is set equal to 1, which is to say that the time constant $R_a C_a$ is set equal to the time it takes for a sound wave to travel distance "d." A FOG microphone element, suitable for use in connection with the present invention, is the EM118 manufactured by the Primo Microphone, Inc. Another popular shape of the microphone assembly directivity pattern is known as a super cardioid. It is obtained when d, $R_a$, and V are adjusted such that B is set equal to the square root of 3. Further, by increasing the value of B to 3, a hypercardioid directivity pattern is created. Each of the selected microphone configurations has its own set of characteristics such as: (i) the location (in degrees) of its null; (ii) distance factor—a multiplier indicating how many times more than the distance from a pressure microphone to the sound source that a directional microphone can be and have the same signal-to-random incident noise ratio; (iii) front-to-back response ratio etc.

PREFERRED EMBODIMENT

FIG. 1 is a front perspective view disclosing a low profile unitary housing 100 for a FOG microphone element that effectively limits the distance "d" between sound ports 101 and 102 of the microphone assembly and the FOG microphone element contained therein to a relatively short distance. Indeed, it is desirable to have distance "d" be the width of the microphone element which will be inserted into the inner chamber of unitary housing 100, as shown and described below. This rectangular block boot structure is molded from vulcanized (cured) rubber or other suitable resilient material and replaces the baffle of the prior microphone assembly described above. The unitary housing is made from an acoustically opaque material which does not transmit sound pressure as efficiently as air. As indicated above, one suitable material that is commercially available is Ethylene-Propylene-Diene-Monomer with Polypropylene.

However, housing 100 includes ports 101 and 102 which admit sound pressure, via acoustically transparent channels 103 and 104, respectively, into the inner chamber where the microphone element 201 resides (see FIGS. 2–5). Microphone element 201 includes a pair of wires (not shown) that exit the unitary housing 100 through a selfsealing hole 105. Unitary housing 100 is resilient and is sized to form a seal with the microphone element 201 so that the sound pressure in one of the channels is not leaked to the other channel around the microphone element. Advantageously, by using a resilient material for the housing, the need for adhesives to achieve sealing is eliminated.

Figure 3:
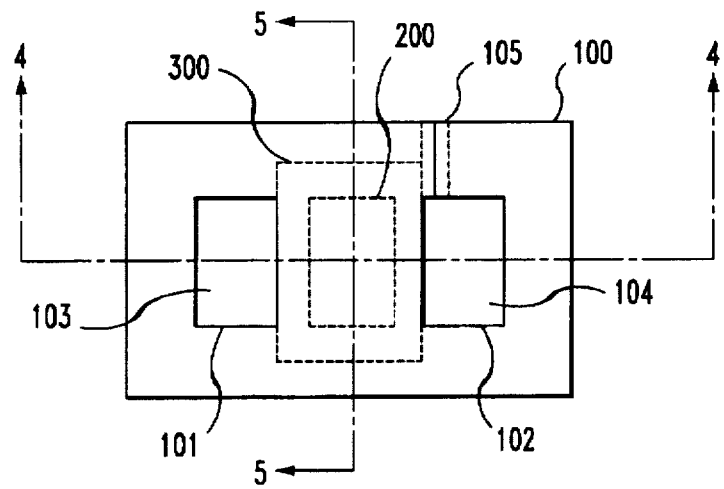
FIG. 3 is a top cross-sectional view of the unitary boot arrangement employed in the invention.

FIG. 3 is a top cross-sectional view of the resilient unitary housing assembly 100, illustrating the its interrelationship with FOG microphone element 201 (FIG. 2), ports 101 and 102, channels 103 and 104, hole 105, opening 200 (FIG. 2) and inner chamber 300. Note that inner chamber 300 is dimensioned to house and support microphone element 201 such that a seal is formed around microphone element 201 so that acoustic energy does not leak from one of the channels 103, 104 to the other. Additionally, note that opening 200 is dimensioned to be smaller in size than the cross-section of microphone element 201 such that when microphone element 201 is inserted into inner chamber 300 a seal will be formed around it and opening 200 so that acoustic energy cannot leak out of or into inner chamber 300 via opening 200.

Figure 4:
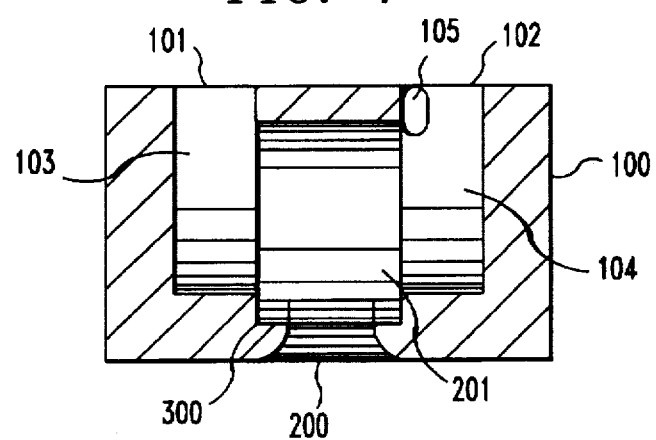
FIG. 4 is a side cross-sectional view of the unitary boot arrangement employed in the invention.

FIG. 4 is a side cross-sectional view of resilient unitary housing 100 including microphone element 201 inserted into inner chamber 300. Note the dimensional relationship of opening 200 to the dimensions of microphone element 201 thereby forming the desired seal for the acoustic energy. The sealing effected by resilient housing 100 is also shown around microphone element 201 and channels 103 and 104.

Figure 5:
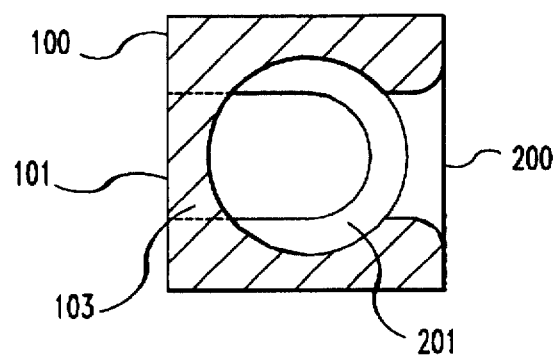
FIG. 5 is a front cross-sectional view of the unitary boot arrangement employed in the invention.

FIG. 5 is a front cross-sectional view of the unitary boot arrangement employed in the embodiment of the invention. Shown are the dimensional relationships of microphone element 201 to channels 103 and 104 and to opening 200 in the resilient unitary housing 100.

Note that in FIGS. 3-5 the dimensions shown are approximately five (5) times those of one embodiment of the inventive microphone assembly.

APPLICATIONS

The present invention may be installed in any sound-input equipment that uses a directional microphone. Sound-input equipment such as a telephone hand set, speaker phone, personal computer or the like are representative examples.

Figure 6:
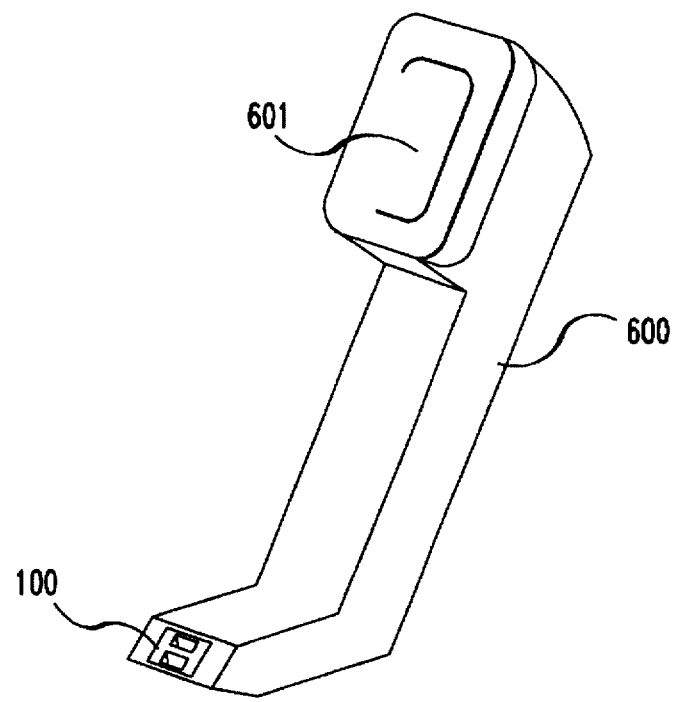
FIG. 6 shows a telephone hand set employing an embodiment of the invention.

FIG. 6 discloses one application of the present invention within a telephone hand set 600. Telephone hand set 600 includes a speaker 601, and the unitary housing assembly 100 including a microphone element to form a directional microphone arrangement is positioned along one surface of telephone hand set 600, as shown. Hand set 600 can be a standard hand set, a cordless phone, a cellular phone or the like.

Figure 7:
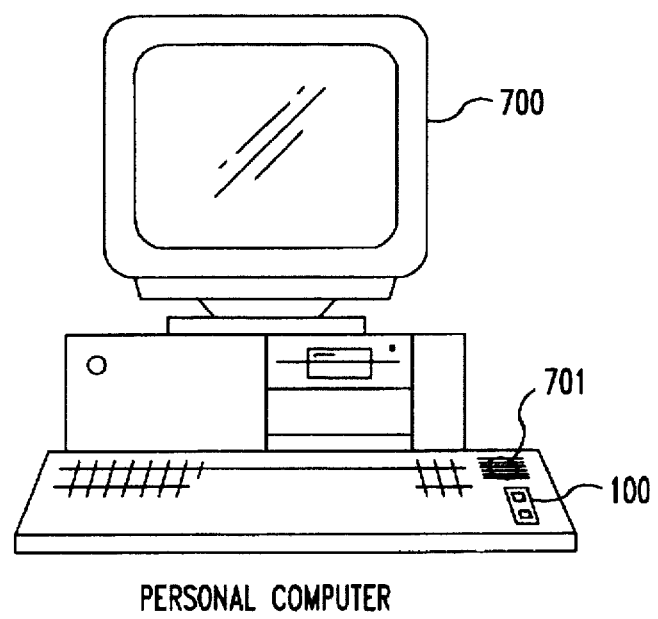
FIG. 7 shows a personal computer employing an embodiment of the invention.

FIG. 7 shows a personal computer arrangement including a speaker phone employing an embodiment of the invention. Specifically, shown is personal computer 700 including loudspeaker 701, and the unitary housing assembly 100 including a microphone element to form a directional microphone arrangement is positioned on one surface of personal computer 700, as shown. This arrangement allows for hands free telephony operation. Although a desk top type personal computer is shown for illustrative purposes, it will be apparent that an embodiment of the invention may be included in speakerphone arrangements in other similar or dissimilar equipment, one example being a lap-top personal computer.

Additionally, it should be noted that since the lengths of acoustic channels 103 and 104 are relatively short, there will be little effect in the directivity patterns or frequency response of, for example, cardioid or dipole directional microphone assemblies.

Although a particular embodiment of the present invention has been shown, it is clear that modifications are possible within the scope of the invention. Such modifications include, but are not limited to, the use of other resilient materials for fabricating the housing, the use of housings that are not molded, and openings in the housing that are non-rectangular or that do not reside in the same plane. Further, rather than using a single FOG microphone element, the use of two electrically-interconnected, pressure microphone elements is contemplated within the spirit of the invention.

I claim:

1. An assembly for use in forming a directional microphone arrangement comprising: a resilient unitary housing intended to house a microphone element including a diaphragm responsive to differential sound pressure on opposite sides thereof for generating an electrical signal proportional to the differential sound pressure, the resilient unitary housing inducting: (i) a first acoustically-transparent channel for communicating sound pressure from a first port in the housing to one side of the diaphragm; (ii) a second acoustically-transparent channel for communicating sound pressure from a second port in the housing to the other side of the diaphragm; (iii) an inner chamber communicating with the fast and second channels for housing said microphone element; and (iv) an opening in an outer surface of said resilient unitary housing, said opening extending to said inner chamber for insertion of the microphone element through said opening into said inner-chamber, said opening being dimensioned such that the perimeter of said opening is such that the resilient unitary housing will seal tightly around said microphone element when inserted into said inner chamber so that there is no leakage from said inner chamber or coupling of sound energy from one side of said microphone element to said other side of said microphone element.

2. The assembly of claim 1 wherein the resilient unitary housing supports the microphone element and forms a continuous seal around the outside perimeter of the microphone element so that the sound pressure in one channel is not communicated to the other channel.

3. The assembly of claim 2 wherein the resilient unitary housing comprises Ethylene-Propylene-Diene-Monomer with Polypropylene.

4. The assembly of claim 2 wherein a FOG microphone element is inserted into said inner chamber to form a directional microphone assembly.

5. The assembly of claim 4 combined with sound-input equipment having an exterior surface, the directional microphone assembly being embedded within or positioned directly behind said exterior surface of the sound-input equipment and forming a seal therewith; whereby sound-input equipment having a low profile appearance with improved microphone sensitivity and directivity is formed.

6. The assembly of claim 5 wherein the sound-input equipment comprises a telephone hand set.

7. The assembly of claim 5 wherein the sound-input equipment comprises a teleconferencing unit.

8. The assembly of claim 5 wherein the sound-input equipment comprises a personal computer.

9. The assembly of claim 5 further including telephone apparatus having a loudspeaker mounted therein for enabling hands-free operation, and said resilient unitary housing including said FOG microphone element forming said directional microphone arrangement being mounted along an exterior surface thereof.

* * * * *